US010455480B2

United States Patent
Cormier et al.

(10) Patent No.: US 10,455,480 B2
(45) Date of Patent: Oct. 22, 2019

(54) CUSTOMIZATION OF DATA SESSION RETRY MECHANISM IN A WIRELESS PACKET DATA SERVICE NETWORK

(71) Applicant: BlackBerry Limited, Waterloo (CA)

(72) Inventors: Jean-Philippe Paul Cormier, London (GB); Thomas Leonard Trevor Plestid, Ottawa (CA); Ian Simpson, Ottawa (CA); Arun Munje, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/852,270

(22) Filed: Dec. 22, 2017

(65) Prior Publication Data

US 2018/0124681 A1 May 3, 2018

Related U.S. Application Data

(63) Continuation of application No. 14/666,048, filed on Mar. 23, 2015, now Pat. No. 9,854,504, which is a
(Continued)

(51) Int. Cl.
*H04W 48/06* (2009.01)
*H04W 76/19* (2018.01)
(Continued)

(52) U.S. Cl.
CPC ............ *H04W 48/06* (2013.01); *H04L 63/10* (2013.01); *H04W 12/12* (2013.01); *H04W 28/18* (2013.01);
(Continued)

(58) Field of Classification Search
CPC ...... H04L 63/10; H04L 41/5025; H04L 47/24; H04L 63/08; H04L 65/1073;
(Continued)

(56) References Cited

U.S. PATENT DOCUMENTS

| 5,276,911 A | 1/1994 | Levine et al. |
| 5,940,770 A | 8/1999 | Kuki |

(Continued)

FOREIGN PATENT DOCUMENTS

| JP | 5-102919 | 4/1993 |
| JP | 7-231334 | 8/1995 |

(Continued)

OTHER PUBLICATIONS

"Configuring Load Balancing on the GGSN", Cisco GGSN Release 5.0 Configuration Guide, Chapter 11, pp. 1-30.
(Continued)

*Primary Examiner* — Kwasi Karikari
(74) *Attorney, Agent, or Firm* — Fish & Richardson P.C.

(57) ABSTRACT

In one embodiment, a method is provided for customization of a mobile communications device's data session retry mechanism in a wireless packet data service network. The mobile communication device requests activation of a data session with a node via the wireless network and receives a reject message via the wireless network in response to the request for activation of the data session, the reject message including a cause code. If the cause code corresponds to a no-retry behavior of the data session retry mechanism of the mobile communication device, the mobile communications device no longer requesting activation of a data session with the node.

20 Claims, 8 Drawing Sheets

Related U.S. Application Data continuation of application No. 13/950,803, filed on Jul. 25, 2013, now Pat. No. 8,989,709, which is a continuation of application No. 12/480,569, filed on Jun. 8, 2009, now Pat. No. 8,515,391, which is a continuation of application No. 10/981,864, filed on Nov. 5, 2004, now Pat. No. 7,561,891.

(51) Int. Cl.
*H04L 29/06* (2006.01)
*H04W 12/12* (2009.01)
*H04W 28/18* (2009.01)
*H04W 60/00* (2009.01)
*H04W 8/24* (2009.01)
*H04W 12/06* (2009.01)
*H04W 80/00* (2009.01)

(52) U.S. Cl.
CPC .......... *H04W 60/00* (2013.01); *H04W 76/19* (2018.02); *H04W 8/245* (2013.01); *H04W 12/06* (2013.01); *H04W 80/00* (2013.01)

(58) Field of Classification Search
CPC . H04W 76/027; H04W 76/00; H04W 76/062; H04W 76/064; H04W 60/00; H04W 8/06; H04W 40/24; H04W 48/18; H04W 48/20; H04W 60/02
See application file for complete search history.

(56) References Cited

U.S. PATENT DOCUMENTS

| | | | |
|---|---|---|---|
| 6,356,755 B1 * | 3/2002 | Valentine | H04W 60/00 455/434 |
| 6,411,814 B1 | 6/2002 | Hirade | |
| 6,438,122 B1 | 8/2002 | Monrad et al. | |
| 6,477,373 B1 | 11/2002 | Rappaport | |
| 6,577,866 B1 | 6/2003 | Roberts | |
| 6,628,954 B1 | 9/2003 | McGowan et al. | |
| 6,636,491 B1 | 10/2003 | Kari et al. | |
| 7,561,891 B2 | 7/2009 | Cormier et al. | |
| 8,571,548 B2 * | 10/2013 | Poikselka | H04M 3/42153 455/432.3 |
| 2002/0105938 A1 | 8/2002 | Suzuki | |
| 2003/0119520 A1 | 6/2003 | Yoshioka et al. | |
| 2003/0161325 A1 | 8/2003 | Kekki | |
| 2003/0177389 A1 | 9/2003 | Albert et al. | |
| 2003/0210649 A1 | 11/2003 | Bondi | |
| 2004/0008650 A1 | 1/2004 | Le et al. | |
| 2004/0125776 A1 | 7/2004 | Haugli et al. | |
| 2004/0147266 A1 | 7/2004 | Hwang et al. | |
| 2005/0037753 A1 | 2/2005 | Andersen et al. | |
| 2005/0141527 A1 | 6/2005 | Gateva et al. | |
| 2005/0153684 A1 | 7/2005 | Rodrigo | |
| 2006/0034204 A1 | 2/2006 | Lee et al. | |
| 2006/0052099 A1 | 3/2006 | Parker | |
| 2009/0245158 A1 | 10/2009 | Cormier et al. | |

FOREIGN PATENT DOCUMENTS

| | | |
|---|---|---|
| JP | 8-037526 | 2/1996 |
| TW | 200306751 | 11/2003 |
| TW | 200400728 | 1/2004 |
| TW | 200401571 | 1/2004 |

OTHER PUBLICATIONS

Ho et al., Throughput and Buffer Analysis for GSM General Packet Radio Service (GPRS), Nortel Networks, 1999, pp. 1427-1431.

Ng, "Simulation of General Packet Radio Service Network", Simon Fraser University, Apr. 2002, 52 pgs.
Zhou et al., "Improve TCP Performance in Ad Hoc Network by TCP-RC," The 14th IEEE 2003 International Symposium, 2003, pp. 215-220.
IP Australia, Examiner's First Report, Application No. 2005227354, dated Feb. 17, 2009, 1 pg.
IP Australia, Notice of Acceptance, Application No. 2005227354, dated Apr. 24, 2009, 3 pgs.
CIPO, Office Action, Application No. 2,524,996, dated Nov. 17, 2009, 2 pgs.
CIPO, Notice of Allowance, Application No. 2,524,996, dated Jun. 3, 2010, 1 pg.
SIPO, First Office Action, Application No. 200510120078.8, dated Jun. 19, 2009, 4 pgs.
EPO Search Report, Application No. 04256879.0, dated Apr. 15, 2005, 5 pgs.
IP India, First Examination Report, Application No. 2876/DEL/2005, dated Dec. 13, 2012, 2 pgs.
JPO, Notice of Reasons for Rejection, Application No. 2005-320154, dated Apr. 21, 2011, 5 pgs.
KIPO, Notice of Decision for Patent, Application No. 10-2005-0105416, dated Apr. 1, 2011, 1 pg.
KIPO, Office Action, Application No. 10-2011-0023417, dated May 9, 2011, 3 pgs.
KIPO, Notice of Decision for Patent, Application No. 10-2011-0023417, dated Dec. 12, 2011, 3 pgs.
IPOS, Notification of Grant, Application No. 200506917-4, dated May 30, 2008, 2 pgs.
TIPO, Office Action, Application No. 094138840, dated Jul. 5, 2010, 2 pgs.
US PTO Office Action, U.S. Appl. No. 10/981,864, dated Jun. 1, 2006, 14 pgs.
US PTO Office Action, U.S. Appl. No. 10/981,864, dated Nov. 13, 2006, 14 pgs.
USPTO Office Action, U.S. Appl. No. 10/981,864, dated Aug. 9, 2007, 14 pgs.
USPTO Office Action, U.S. Appl. No. 10/981,864, dated Mar. 17, 2008, 14 pgs.
US PTO Notice of Allowance, U.S. Appl. No. 10/981,864, dated Mar. 9, 2009, 8 pgs.
USPTO, Notice of Publication, U.S. Appl. No. 12/480,569, dated Oct. 1, 2009, 1 pg.
USPTO, Office Action, U.S. Appl. No. 12/480,569, dated Oct. 26, 2009, 6 pgs.
USPTO, Office Action, U.S. Appl. No. 12/480,569, dated Apr. 30, 2010, 8 pgs.
USPTO, Office Action, U.S. Appl. No. 12/480,569, dated Jul. 30, 2010, 7 pgs.
USPTO, Office Action, U.S. Appl. No. 12/480,569, dated Dec. 6, 2010, 8 pgs.
USPTO, Office Action, U.S. Appl. No. 12/480,569, dated May 11, 2011, 9 pgs.
USPTO, Notice of Allowance, U.S. Appl. No. 12/480,569, dated Apr. 15, 2013, 15 pgs.
USPTO, Office Action, U.S. Appl. No. 13/950,803, dated Aug. 7, 2014, 18 pages.
USPTO, Notice of Allowance, U.S. Appl. No. 13/950,803, dated Nov. 13, 2014, 15 pages.
Brazilian Office Action issued in Brazilian Application No. PI0520893-9 dated Jul. 17, 2018, 7 pages.
Indian Examination report issued in Indian Application No. 611/DEL/2011 dated Aug. 14, 2018, 6 pages.
Brazilian Office Action issued in Brazilian Application No. PI0520893-9 dated Feb. 26, 2019, 3 pages.
Office Action issued in Indian Application No. 611/DEL/2011 dated Jun. 26, 2019, 13 pages (With English Translation).

* cited by examiner

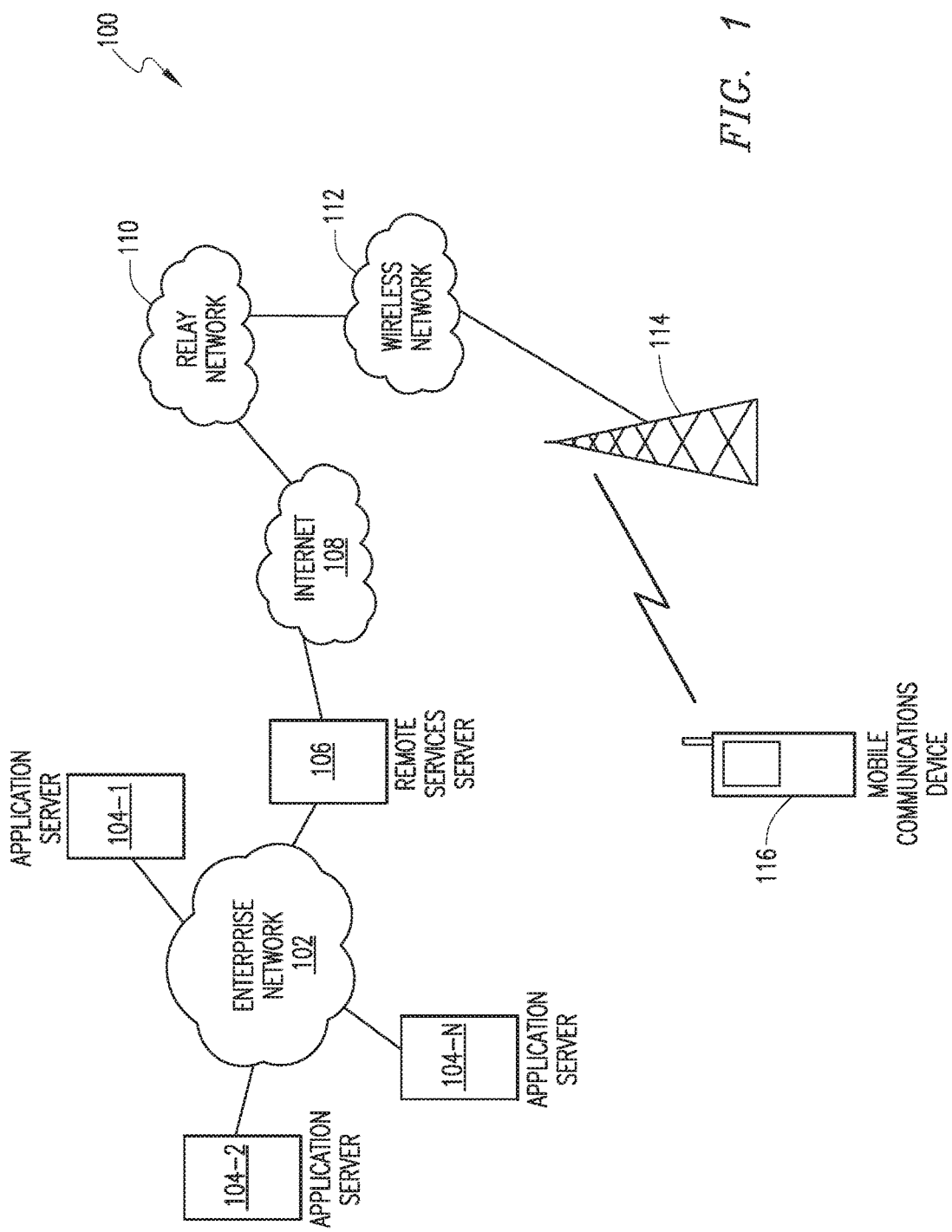

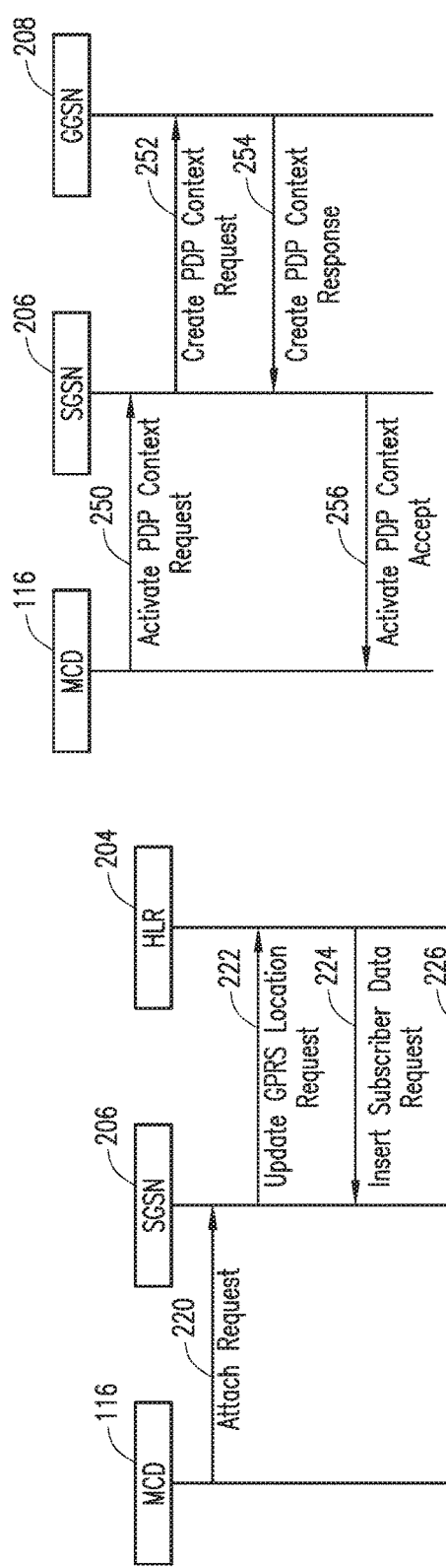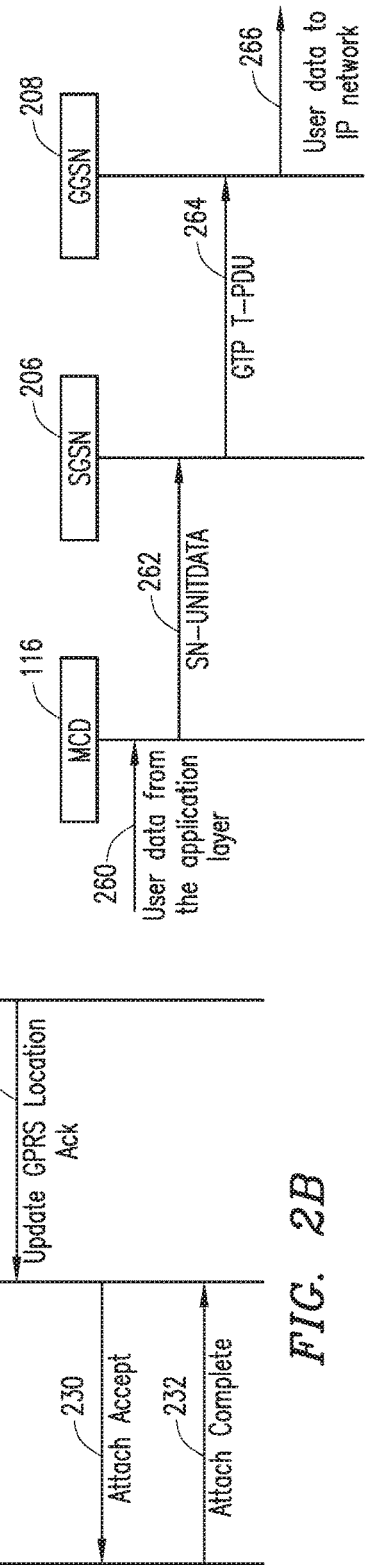
FIG. 2B
FIG. 2C
FIG. 2D

| CC 302 | Explanation 304 |
|---|---|
| # 26: | insufficient resources |
| # 27: | missing or unknown APN |
| # 28: | unknown PDP address or PDP type |
| # 29: | user authentication failed |
| # 30: | activation rejected by GGSN |
| # 31: | activation rejected, unspecified |
| # 32: | service option not supported |
| # 33: | requested service option not subscribed |
| # 34: | service option temporarily out of order |
| # 35: | NSAPI already used |
| # 95-111: | protocol errors |

*FIG. 3*

| Carrier 402 | CC 404 | Retry Mechanism Flag 406 |
|---|---|---|
| Carrier-A | CC #1 | No Retry |
| | CC #2 | No Retry |
| | CC #3 | Retry |
| | ⋮ | ⋮ |
| Carrier-B | CC #1 | No Retry |
| | CC #2 | No Retry |
| | ⋮ | ⋮ |
| | CC #N | Retry |
| | ⋮ | ⋮ |
| ⋮ | ⋮ | ⋮ |

CUSTOMIZATION OF DATA SESSION RETRY MECHANISM IN A WIRELESS PACKET DATA SERVICE NETWORK

CLAIM OF PRIORITY UNDER 35 U.S.C. § 120 & 37 C.F.R. § 1.78

This non-provisional application is a continuation application claiming the benefit of the following prior United States patent application having the same title: application Ser. No. 14/666,048, filed Mar. 23, 2015, which itself is a continuation of application Ser. No. 13/950,803, filed Jul. 25, 2013, which itself is a continuation of application Ser. No. 12/480,569, filed Jun. 8, 2009, which is itself a continuation of application Ser. No. 10/981,864, filed Nov. 5, 2004 and now issued as U.S. Pat. No. 7,561,891, each of which is hereby incorporated by reference.

FIELD OF THE APPLICATION

The present patent application generally relates to wireless packet data service networks. More particularly, and not by way of an limitation, the present patent application is directed to a scheme for customization of a mobile device's data session retry mechanism in a wireless packet data service network.

BACKGROUND

Radio resources in a wireless packet data service network are scarce. When a data-centric mobile device continues to negotiate with the network infrastructure for establishing a data session even after it receives certain reject codes, such repeated attempts can contribute to an increase in the signaling load in the network whereby the overall performance of the network may be negatively impacted.

BRIEF DESCRIPTION OF THE DRAWINGS

A more complete understanding of the embodiments of the present patent application may be had by reference to the following Detailed Description when taken in conjunction with the accompanying drawings wherein:

FIG. 1 depicts an exemplary network environment including a wireless packet data service network wherein an embodiment of the present patent application may be practiced;

FIGS. 2B-2D depict message flow diagrams with respect to various signaling procedures utilized in accordance with an embodiment;

FIG. 3 depicts an exemplary list of cause codes operable with the wireless packet data service network shown in FIG. 2A in servicing a mobile communications device according to one embodiment;

FIG. 4 depicts an exemplary structure for mapping cause codes of a wireless packet data service network to a flag relating to a mobile communications device's data session retry mechanism;

DETAILED DESCRIPTION OF THE DRAWINGS

Figure 2A:
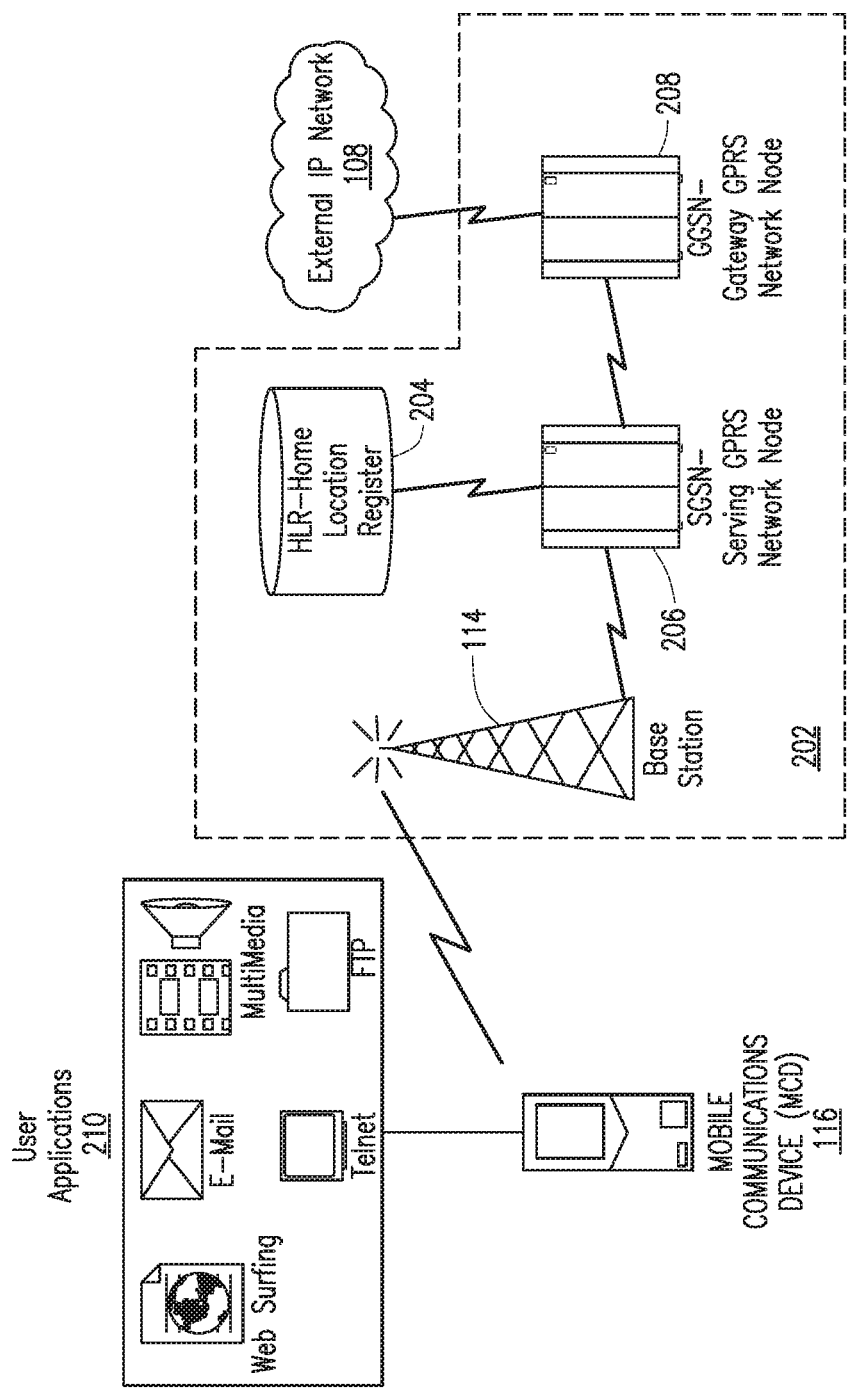
FIG. 2A depicts additional details of an exemplary wireless packet data service network operable with a mobile communications device in accordance with an embodiment.

In one aspect, an embodiment of a mobile communications device is disclosed. The claimed embodiment comprises at least one or more of the following features: means for detecting that a code has been received at the mobile communications device from an external node; means for determining whether the code is identified as a critical code; and means for disabling a data session retry mechanism of the mobile communications device if the code is identified as a critical code.

In another aspect, an embodiment of a method for controlling a mobile communications device is disclosed. The claimed embodiment comprises at least one or more of the following features: detecting that a code has been received at the mobile communications device from an external node; determining whether the code is identified as a critical code; and disabling a data session retry mechanism of the mobile communications device responsive to a determination that the code is identified as a critical code.

In yet another aspect, an embodiment of a network node is disclosed. The claimed embodiment comprises at least one or more of the following features: a structure configured to receive a code; a structure configured to query a database to determine whether the code received at the node is identified in the database as a critical code; and a structure configured to a communicate to a mobile communications device whether the code received at the node is identified in the database as a critical code, thereby disabling a data session retry mechanism of the mobile communications device if the code is identified in the database as a critical code.

A system and method of the present patent application will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network environment 100 including a wireless packet data service network 112 wherein an embodiment of the present patent application may be practiced. An enterprise network 102, which may be a packet-switched network, can include one or more geographic sites and be organized as a local area network (LAN), wide area network (WAN) or metropolitan area network (MAN), et cetera, for serving a plurality of corporate users. A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-$i$, i=1, 2, . . . , N, with respect to the services supported in the enterprise network 102.

Additionally, a remote services server 106 may be interfaced with the enterprise network 102 for enabling a corporate user to access or effectuate any of the services from a remote location using a suitable mobile communications device (MCD) 116. A secure communication link with end-to-end encryption may be established that is mediated through an external IP network, i.e., a public packet-switched network such as the Internet 108, as well as the wireless packet data service network 112 operable with MCD 116 via suitable wireless network infrastructure that includes a base station (BS) 114. In one embodiment, a trusted relay network 110 may be disposed between the Internet 108 and the infrastructure of wireless packet data service network 112. By way of example, MCD 116 may be a data-enabled handheld device capable of receiving and sending messages, web browsing, interfacing with corporate application servers, et cetera.

For purposes of the present patent application, the wireless packet data service network 112 may be implemented in any known or heretofore unknown mobile communications technologies and network protocols, as long as a packet-switched data service is available therein for transmitting packetized information. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, or any $3^{rd}$ Generation (3G) network. By way of providing an exemplary embodiment, the teachings of the present patent application will be illustrated with a GPRS-based carrier network, although those skilled in the art should readily recognize that the scope of the present patent application is not limited thereby.

FIG. 2A depicts additional details of an exemplary wireless packet data service network operable with a mobile communications device in accordance with an embodiment. As illustrated, reference numeral 202 refers to a GPRS network operable as the wireless packet data service network with respect to MCD 116 that is provided with a number of data-centric user applications 210 such as, e.g., web browsing, email, multimedia, File Transfer Protocol or FTP, telnet, etc. Base station 114 serves MCD 116 via the air interface using applicable radio layer protocols.

GPRS uses a packet-switching technique to transfer both high-speed and low-speed data and signaling in an efficient manner over GSM radio networks. Packet switching means that GPRS radio resources are used only when users are actually sending or receiving data. Rather than dedicating a radio channel to a mobile data user, e.g., MCD 116, for a fixed period of time, the available radio channels can be concurrently shared between several users. Therefore, GPRS is designed to support from intermittent and bursty data transfers (e.g., web browsing) to occasional transmission of large volumes of data (e.g., FTP). Allocation of GPRS radio channels can be flexible: from 1 to 8 radio interface timeslots can be allocated per one Time Division Multiple Access (TDMA) frame. Typically, timeslots are shared by the active users, and uplinks and downlinks are allocated separately. Various radio channel coding schemes are available to allow a range of data bit transfer rates.

Two additional network nodes are provided within a GSM network in order to implement a packet-switched data transfer service. A Serving GPRS Support Node (SGSN) 206, which is coupled to a Home Location Register (HLR) 204 and disposed at the same hierarchical level as a Mobile Switching Center (MSC) of the circuit-switched cellular network, is operably coupled to BS 114 and keeps track of the location of a GPRS user such as the user of MCD 116. Further, SGSN 206 is responsible for performing security functions and handling access control with respect to MCD 116. A Gateway GPRS Support Node (GGSN) 208 provides interworking with the external packet-switched IP network 108, and is operably coupled to one or more SGSNs, e.g., SGSN 206, via an IP-based GPRS backbone network.

In order to access the packet data service, MCD 116 makes its presence known to the network by performing what is known as a GPRS Attach. Thereafter, to send and receive packet data, MCD 116 activates the packet data address that it wants to use. This operation renders MCD 116 "visible" in the corresponding GGSN, and interworking with external data networks can then begin. User data is transferred transparently between MCD 116 and the external data networks with a method known as encapsulation and tunneling wherein data packets are equipped with GPRS-specific protocol information and transferred transparently between MCD 116 and GGSN 208.

To get access to the GPRS network 202 and to start data transmission, various signaling procedures are therefore effectuated before activating a Packet Data Protocol (PDP) context between MCD 116 and the network. FIGS. 2B-2D depict a plurality of message flow diagrams with respect to various signaling procedures utilized in the GPRS network 202 in accordance with an embodiment. Referring in particular to FIG. 2B, an Attach signaling procedure is described therein. In an Attach procedure, MCD 116 provides its identity, e.g., International Mobile Station Identity (IMSI), and the type of attach (i.e., GPRS Attach) via an Attach Request message 220 to SGSN 206. Once SGSN 206 obtains the identity of MCD 116, it retrieves the subscriber information from HLR 204. If the subscriber information cannot be found, SGSN 206 will return an Attach Reject reply message to MCD 116. If the requisite subscriber information is found in HLR 204, SGSN 206 accepts the Attach Request message 220 and allocates a new identifier, e.g., Packet-Temporary Mobile Station Identity or P-TMSI, to MCD 116. A Temporary Logical Link Identifier (TLLI) is then derived from the P-TMSI received from SGSN 206. The derived TLLI will be used by MCD 116 to identify itself for subsequent signaling or data procedures with the GPRS network.

Accordingly, responsive to the Attach Request message 220, SGSN 206 updates HLR 204 with the current location of MCD 116 by sending an Update GPRS Location Request message 222. In response, HLR 204 sends the subscriber information relating to MCD 116 to SGSN 206 through an Insert Subscriber Data Request message 224, which is acknowledged by SGSN 206 via an Acknowledge message 226. Thereafter, HLR 204 acknowledges completion of update location to SGSN 206 via an Update GPRS Location Acknowledge message 228. Since appropriate subscriber information has been found in HLR 204, SGSN 206 sends an Attach Accept message 230 with a P-TMSI to MCD 116. In response, MCD 116 returns an Attach Complete message 232 with a TLLI derived from the P-TMSI to acknowledge the receipt of the P-TMSI.

After the Attach procedure is successfully executed, MCD 116 enters a Ready state whereupon a Mobility Management (MM) context, which is a record that contains subscriber information and MCD identity, is established in both MCD 116 and SGSN 206. Thereafter, MCD 116 may activate a PDP context via an Activation signaling procedure for communicating with an external data network. FIG. 2C depicts a message flow diagram with respect to an Activation signaling procedure. MCD 116 is operable to specify a Transaction Identifier (TI) and a Network Service Access Point Identifier (NSAPI) which are used by the GPRS infrastructure to uniquely identify a data session. In a further implementation, MCD 116 can include an Access Point Name (APN) in the message, which directs SGSN 206 to select a particular GGSN for use. By way of example, MCD 116 may send an Activate PDP Context Request message 250 with such parameters as TI, NSAPI, APN, Requested Quality of Service (QoS), etc., to SGSN 206. Upon validating the message, SGSN 206 sends a Create PDP Context Request message 252 to the appropriate GGSN 208 with a Tunnel Identifier (TID) constructed by appending the identity of MCD 116 and the NSAPI. GGSN 208 validates the parameters in the Create PDP Context Request message 252 and returns a Create PDP Context Response message 254 with no error code if the Request is accepted. Thereafter, SGSN 206 sends an Activate PDP Context Accept message 256 to MCD 116 to indicate that the requested data session has been activated.

User data coming from the application layer may be encapsulated before reaching the external packet data network. As shown in FIG. 2D, user data 260 is first tunneled between MCD 116 and SGSN 206 in a SubNetwork (SN)-UNITDATA message 262. The user data is then tunneled between SGSN 206 and GGSN 208 in a GPRS Tunneling Protocol (GTP) Tunneling-Packet Data Unit (T-PDU) message 264. Thereafter, GGSN 208 extracts the user data 266 and sends it to the external packet data network.

From the foregoing Description, it can be appreciated that various signaling procedures are executed pursuant to activating PDP contexts in a wireless packet data service network such as the GPRS-based network 202. Further, the manner and mode of the signaling behavior in the network can be dependent on the state and condition of the network, e.g., availability of resources, signaling load, congestion, integrity of the physical plant, et cetera. Accordingly, the network management infrastructure is operable to issue a number of cause codes, which signify different network responses based on network conditions as well as MCD-related information (e.g., the network is busy, invalid APN entry, GGSN is out of order, subscriber in default or unauthenticated, et cetera) that can impact a PDP activation procedure initiated by a mobile device.

FIG. 3 depicts an exemplary list of cause codes operable with the wireless packet data service network shown in FIG. 2 in servicing a mobile communications device according to one embodiment. As set forth in table 300, a cause code (CC) column 302 shows a plurality of cause codes, each with a corresponding entry in a related column 304 that provides an explanation of the CC. For example, upon receipt of an Activate PDP Context Request message the network may reject the MCD-initiated context activation by sending an Activate PDP Context Reject message to the MCD that includes a CC #26 (which may be embodied as an n-bit integer) to indicate insufficient resources. Similarly, a CC #29 may be issued if user authentication has failed. Other CC entries of the table 300 are likewise operable to indicate corresponding network responses.

As alluded to in the Background section of the present patent application, when a data-centric mobile device continues to retry establishing a data session with the network upon receiving certain cause codes, e.g., indicating failure of a PDP context, its retransmission logic keeps sending signaling messages towards the network, thereby increasing the signaling load therein. In accordance with the teachings of the present patent application, a scheme is provided wherein the data session retry mechanism of the mobile device is customized based on the cause code functionality so as to reduce such signaling load in the network.

FIG. 4 depicts an exemplary structure 400 for mapping cause codes of a wireless packet data service network to a flag or indicium relating to a mobile communications device's data session retry mechanism. In essence, a subset of the cause codes associated with a carrier network may be identified as "critical" cause codes that are mapped to a "NO RETRY" indicium to signify that the retransmission logic of the data session retry mechanism be disabled when such a cause code is received from the network. In one embodiment, the structure 400 may be provided as a configurable resource file associated with a library that is integrated within the mobile device such as MCD 116. In another embodiment, the configurable library/structure 400 may be provisioned as part of a carrier network's infrastructure, e.g., associated with a GGSN.

As illustrated in FIG. 4, a CC column 404 is provided on a carrier-by-carrier basis identifying various critical codes for the carriers in a carrier column 402. In a retry mechanism flag column 406, each CC is marked with a suitable indicium that indicates whether or not the data session retry mechanism is to be disabled. It should be appreciated that such data may also be configured on a mobile communications device basis. As will be described in detail hereinbelow, an MCD's communications transport protocol stack is operable to query the structure 400 in order to customize its retransmission logic, depending on the status of a new PDP context activation or an existing PDP context.

Figure 5:
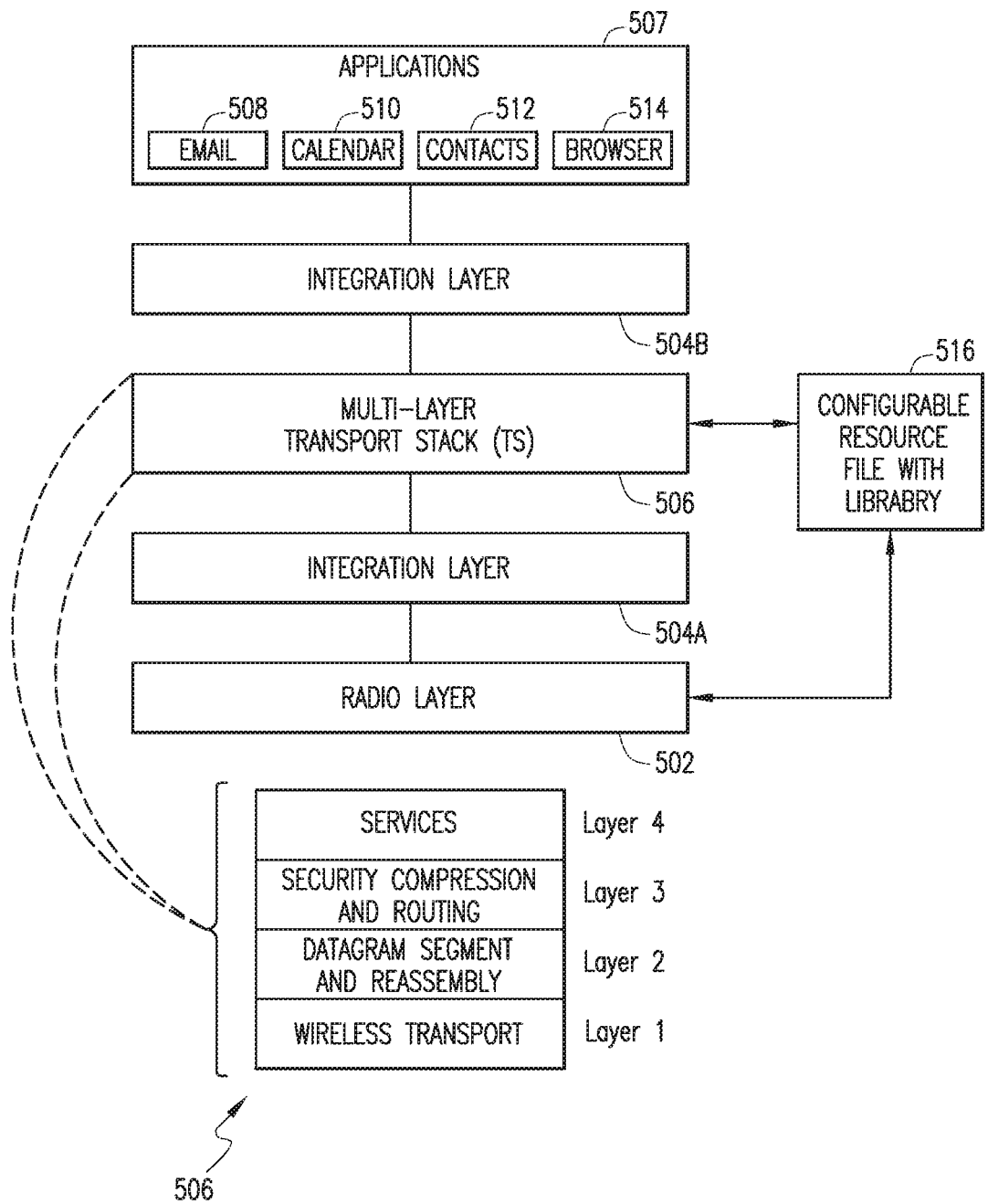
FIG. 5 depicts a software architectural view of a mobile communications device operable to customize its data session retry mechanism according to one embodiment.

FIG. 5 depicts a software architectural view of a mobile communications device operable to customize its data session retry mechanism according to one embodiment. A multi-layer transport stack (TS) 506 is operable to provide a generic data transport protocol for any type of corporate data, including email, via a reliable, secure and seamless continuous connection to a wireless packet data service network. As illustrated in the embodiment of FIG. 5, an integration layer 504A is operable as an interface between the MCD's radio layer 502 and the transport stack 506. Likewise, another integration layer 504B is provided for interfacing between the transport stack 506 and the user applications 507 supported on the MCD, e.g., email 508, calendar/scheduler 510, contact management 512 and browser 514. Although not specifically shown, the transport stack 506 may also be interfaced with the MCD's operating system. In another implementation, the transport stack 506 may be provided as part of a data communications client module operable as a host-independent virtual machine on a mobile device.

The bottom layer (Layer 1) of the transport stack 506 is operable as an interface to the wireless network's packet layer. Layer 1 handles basic service coordination within the exemplary network environment 100 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively.

A configurable CC resource file 516 provided as part of the software environment, is disposed in operable communication with the transport stack 506 as well as the MCD's radio layer 502. In one embodiment, the CC resource file 516 may comprise a query-able library structure such as the embodiment described above in reference to FIG. 4, which includes appropriate mapping between critical cause codes and the MCD's data session retry mechanism. The contents of the library structure may be dynamically configured upon instantiation of the CC resource file 516. The transport stack 506 is operable to access and interrogate the CC resource library under suitable conditions when the retransmission logic of the MCD's data session retry mechanism is invoked. Also, the flag descriptor (i.e., "Retry"/"No Retry") may be passed to the integration layer between the user interface and the radio, where the integration layer manages the retry mechanism.

Figure 6:
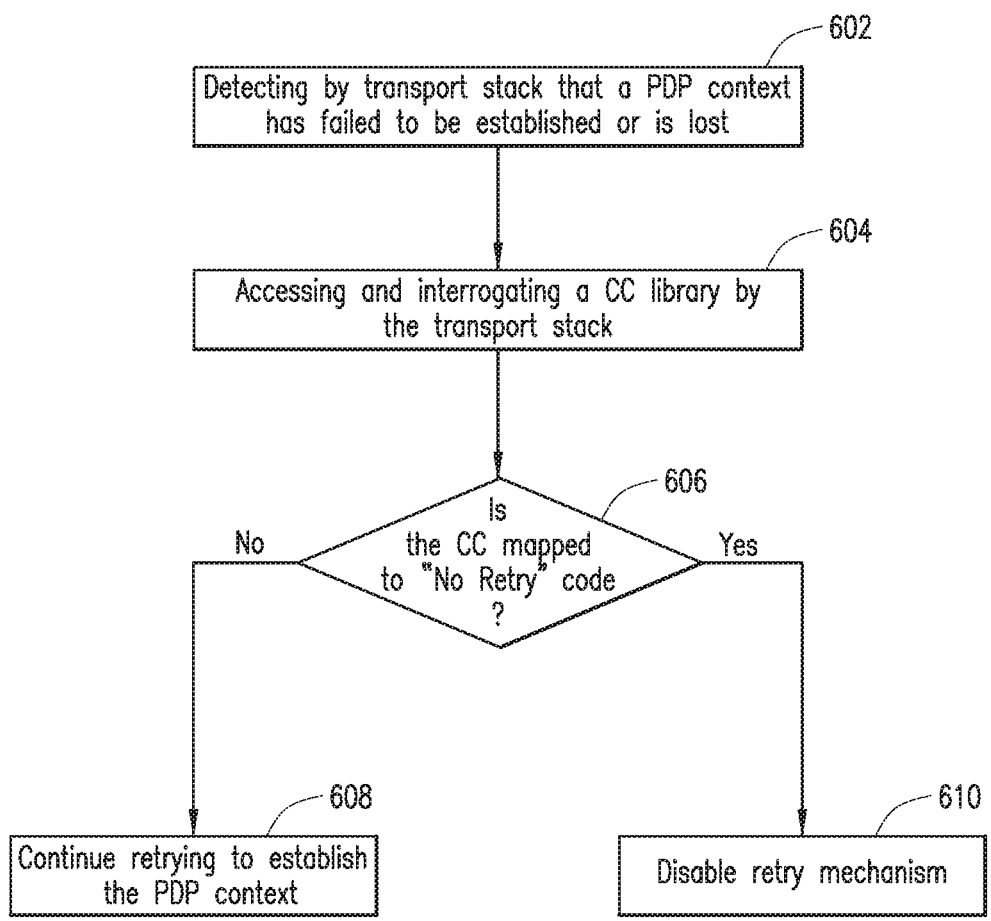
FIG. 6 depicts a flowchart of an embodiment for customizing data session retry operations in a mobile communications device.

FIG. 6 depicts a flowchart of an embodiment for customizing data session retry operations in a mobile communications device. Upon detecting by the transport stack of the MCD that a PDP context has failed to be established or is lost (e.g., because the device is out of coverage area, the PDP context is torn down because of a timeout, et cetera) (block 602), a CC resource file structure/library is queried by the transport stack (block 604). In one implementation, the transport stack may query the structure/library prior to invoking the MCD's retransmission logic or may wait until after a few retransmission attempts have been made. A determination is made if the CC issued by the network is a critical cause code mapped to a "NO RETRY" indicium relating to the MCD's data session retry mechanism (block 606). If not, the retransmission logic of the MCD's data session retry mechanism continues to attempt establishing a PDP context (block 608). Otherwise, the data session retry mechanism is disabled or deactivated (block 610). By way of an exemplary implementation, the data session retry mechanism may be deactivated until the CC structure/library (which has access to the radio layer as an observer) resolves that the retry mechanism may be re-activated.

Figure 7:
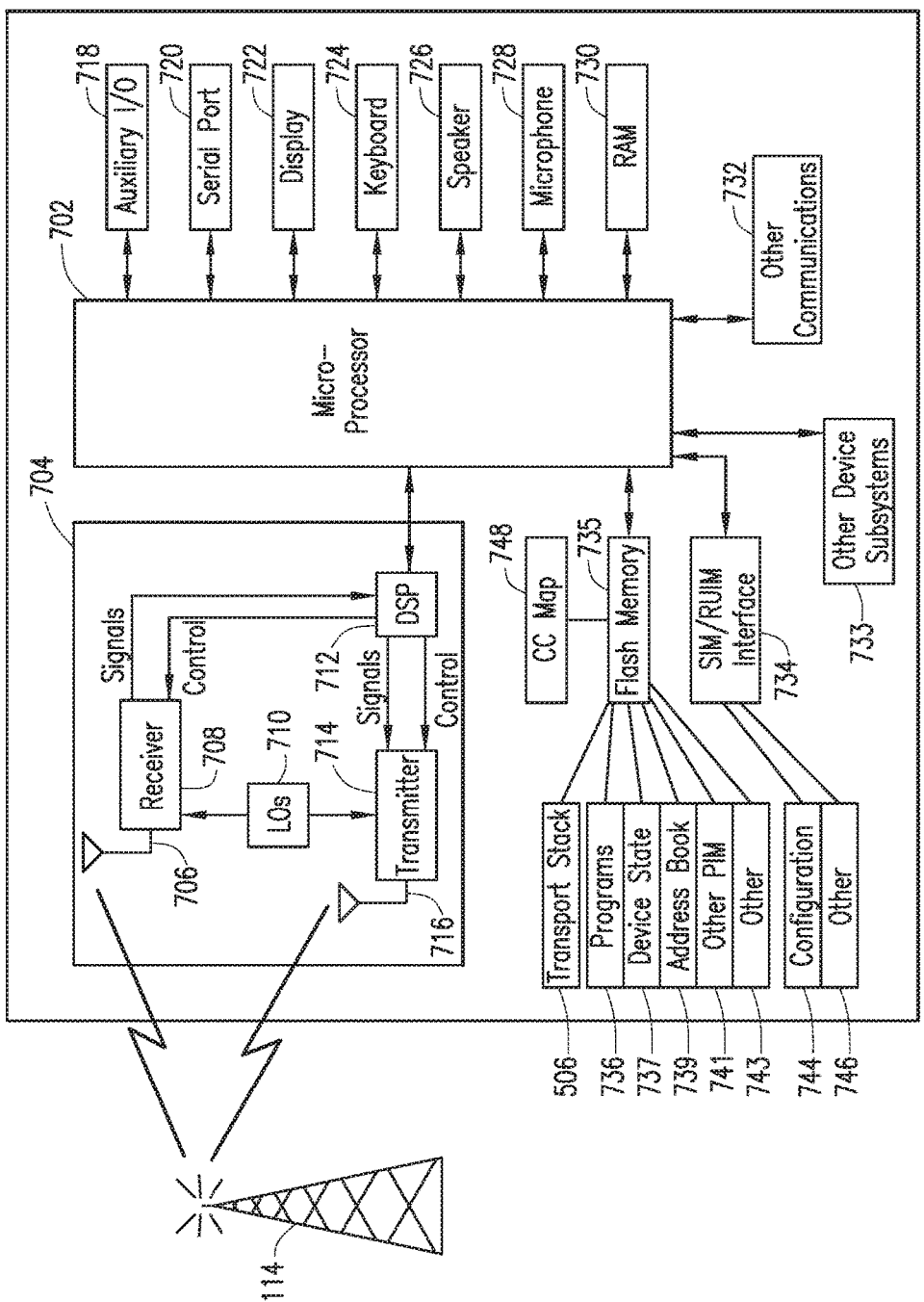
FIG. 7 depicts a block diagram of a mobile communications device operable to customize its data session retry mechanism according to one embodiment.

FIG. 7 depicts a block diagram of a mobile communications device operable to customize its data session retry mechanism according to one embodiment. It will be recognized by those skilled in the art upon reference hereto that although an embodiment of MCD 116 may comprise an arrangement similar to one shown in FIG. 7, there can be a number of variations and modifications, in hardware, software or firmware, with respect to the various modules depicted. Accordingly, the arrangement of FIG. 7 should be taken as illustrative rather than limiting with respect to the embodiments of the present patent application. A microprocessor 702 providing for the overall control of an embodiment of MCD 116 is operably coupled to a communication subsystem 704 which includes a receiver 708 and transmitter 714 as well as associated components such as one or more local oscillator (LO) modules 710 and a processing module such as a digital signal processor (DSP) 712. As will be apparent to those skilled in the field of communications, the particular design of the communication module 704 may be dependent upon the communications network with which the mobile device is intended to operate. In one embodiment, the communication module 704 is operable with both voice and data communications. Regardless of the particular design, however, signals received by antenna 706 through BS 114 are provided to receiver 708, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 712, and provided to transmitter 714 for digital-to-analog (D/A) conversion, frequency up conversion, filtering, amplification and transmission over the air-radio interface via antenna 716.

Microprocessor 702 also interfaces with further device subsystems such as auxiliary input/output (I/O) 718, serial port 720, display 722, keyboard 724, speaker 726, microphone 728, random access memory (RAM) 730, a short-range communications subsystem 732, and any other device subsystems generally labeled as reference numeral 733. To control access, a Subscriber Identity Module (SIM) or Removable User Identity Module (RUIM) interface 734 is also provided in communication with the microprocessor 702. In one implementation, SIM/RUIM interface 734 is operable with a SIM/RUIM card having a number of key configurations 744 and other information 746 such as identification and subscriber-related data.

Operating system software and transport stack software may be embodied in a persistent storage module (i.e., non-volatile storage) such as Flash memory 735. In one implementation, Flash memory 735 may be segregated into different areas, e.g., storage area for computer programs 736 as well as data storage regions such as device state 737, address book 739, other personal information manager (PIM) data 741, and other data storage areas generally labeled as reference numeral 743. Additionally, a CC resource file structure 748 (e.g., along with a library) may be provided as part of the persistent storage for storing a carrier-specific CC map in accordance with the teachings of the present patent application for customization of the MCD's data session retry mechanism.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A method, comprising:
   after an attempt by a mobile communications device to make its presence known has been accepted by a carrier of a wireless network:
      receiving, at the mobile communications device and from the wireless network, a retry configuration associated with a cause code, the retry configuration indicating whether a data session retry mechanism is to be disabled;
      in response to sending a request for a data session with a node, receiving, at the mobile communications device, a message comprising a rejection of the request for activation of the data session, the message comprising the cause code, wherein the data session allows data exchange with packets via the wireless network; and
      in response to the retry configuration associated with the cause code indicating that the data session retry mechanism is to be disabled, disabling, by the mobile communications device, a second request for activation of the data session with the node, wherein the retry configuration is configured by the carrier of the wireless network.

2. The method of claim 1, further comprising:
   receiving a second retry configuration associated with the cause code indicating that the data session retry mechanism is to be enabled; and
   in response to the second retry configuration associated with the cause code indicating that the data session retry mechanism is to be enabled, enabling, by the mobile communications device, a third request for activation of the data session with the node.

3. The method of claim 1, wherein the mobile communications device making its presence known comprises performing an attachment procedure.

4. The method of claim 1, wherein the retry configuration associated with the cause code is stored in a cause code resource file at the mobile communications device, and the cause code resource file stores a second retry configuration associated with a second cause code configured by the carrier.

5. The method of claim 4, wherein the cause code resource file stores a third retry configuration associated with the cause code configured by a second carrier of the wireless network.

6. The method of claim 1, wherein the wireless network comprises at least one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), or a Code Division Multiple Access (CDMA) network.

7. The method of claim 1, wherein activation of the data session includes activation of a packet data protocol (PDP) context.

8. A mobile communications device, comprising:
a memory; and
at least one hardware processor communicatively coupled with the memory and configured to perform a method comprising:
after an attempt by a mobile communications device to make its presence known has been accepted by a carrier of a wireless network:
receiving, at the mobile communications device and from the wireless network, a retry configuration associated with a cause code, the retry configuration indicating whether a data session retry mechanism is to be disabled;
in response to sending a request for a data session with a node, receiving, at the mobile communications device, a reject message comprising a rejection of the request for activation of the data session, the message comprising the cause code, wherein the data session allows data exchange with packets via the wireless network; and
in response to the retry configuration associated with the cause code indicating that the data session retry mechanism is to be disabled, disabling, by the mobile communications device, a second request for activation of the data session with the node, wherein the retry configuration is configured by the carrier of the wireless network.

9. The mobile communications device of claim 8, wherein the method further comprises:
receiving a second retry configuration associated with the cause code indicating that the data session retry mechanism is to be enabled; and
in response to the second retry configuration associated with the cause code indicating that the data session retry mechanism is to be enabled, enabling, by the mobile communications device, a third request for activation of the data session with the node.

10. The method of claim 4, wherein the cause code resource file indicates an association among a plurality of carriers, a plurality of cause codes, and a plurality of retry mechanism flags indicating whether a data session retry mechanism is to be disabled.

11. The method of claim 10, further comprises:
comparing the cause code in the message with the retry configuration in the cause code resource file stored at the mobile communications device; and
determining the retry configuration associated with the cause code indicating that the data session retry mechanism is to be disabled by determining that the cause code in the message matches the cause code associated with the retry configuration in the cause code resource file that indicates the data session retry mechanism is to be disabled.

12. The mobile communications device of claim 8, wherein the retry configuration associated with the cause code is stored in a cause code resource file at the mobile communications device, and the cause code resource file stores a second retry configuration associated with a second cause code configured by the carrier.

13. The mobile communications device of claim 12, wherein the cause code resource file stores a third retry configuration associated with the cause code configured by a second carrier of the wireless network.

14. The mobile communications device of claim 8, wherein the wireless network comprises at least one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), or a Code Division Multiple Access (CDMA) network.

15. The mobile communications device of claim 8, wherein activation of the data session includes activation of a packet data protocol (PDP) context.

16. A non-transitory computer-readable medium containing instructions which, when executed, cause a mobile communications device to perform operations comprising:
after an attempt by a mobile communications device to make its presence known has been accepted by a carrier of a wireless network:
receiving, at the mobile communications device and from the wireless network, a retry configuration associated with a cause code, the retry configuration indicating whether a data session retry mechanism is to be disabled;
in response to sending a request for a data session with a node, receiving, at the mobile communications device, a message comprising a rejections of the request for activation of the data session, the message comprising the cause code, wherein the data session allows data exchange with packets via the wireless network; and
in response to the retry configuration associated with the cause code indicating that the data session retry mechanism is to be disabled, disabling, by the mobile communications device, a second request for activation of the data session with the node, wherein the retry configuration is configured by the carrier of the wireless network.

17. The non-transitory computer-readable medium of claim 16, wherein the operations further comprise:
receiving a second retry configuration associated with the cause code indicating that the data session retry mechanism is to be enabled; and
in response to the second retry configuration associated with the cause code indicating that the data session retry mechanism is to be enabled, enabling, by the mobile communications device, a third request for activation of the data session with the node.

18. The non-transitory computer-readable medium of claim 16, wherein the retry configuration associated with the cause code is stored in a cause code resource file at the mobile communications device, and the cause code resource file stores a second retry configuration associated with a second cause code configured by the carrier.

19. The non-transitory computer-readable medium of claim 18, wherein the cause code resource file stores a third retry configuration associated with the cause code configured by a second carrier of the wireless network.

20. The non-transitory computer-readable medium of claim 16, wherein the wireless network comprises at least one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), or a Code Division Multiple Access (CDMA) network.

\* \* \* \* \*